United States Patent
Toraille et al.

(10) Patent No.: US 10,884,174 B2
(45) Date of Patent: Jan. 5, 2021

(54) LIGHTING DEVICE COMPATIBLE WITH NIGHT-VISION EQUIPMENT WITH LATERAL INJECTION WINDOWS FOR DAYTIME AND NIGHTTIME LIGHT

(71) Applicant: THALES, Courbevoie (FR)

(72) Inventors: Vincent Toraille, Moirans (FR); Patrick Rocca, Moirans (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/685,423

(22) Filed: Nov. 15, 2019

(65) Prior Publication Data
US 2020/0158940 A1    May 21, 2020

(30) Foreign Application Priority Data
Nov. 15, 2018  (FR) .................................. 18 71860

(51) Int. Cl.
F21V 8/00          (2006.01)

(52) U.S. Cl.
CPC ............ *G02B 6/0031* (2013.01); *G02B 6/009* (2013.01); *G02B 6/0026* (2013.01); *G02B 6/0068* (2013.01)

(58) Field of Classification Search
CPC ....... G02F 1/1336; G02F 2001/133626; G02F 2203/11; G02B 6/0031; G02B 6/0073; G02B 6/0068; G02B 6/009; G02B 6/0026; G02B 6/0011; G02B 6/0013; G02B 6/0023; G02B 6/0028; G02B 6/0066; F21V 2200/20
See application file for complete search history.

(56) References Cited

U.S. PATENT DOCUMENTS 5,211,463 A * 5/1993 Kalmanash .......... G02B 6/0051
                                                    349/104
6,574,030 B1   6/2003 Mosier
6,842,204 B1 * 1/2005 Johnson ............ G02F 1/133615
                                                    349/61

(Continued)

FOREIGN PATENT DOCUMENTS

CN    104 635 381 A    5/2015
EP     0 560 614 A1    9/1993
              (Continued)

*Primary Examiner* — Bao Q Truong
(74) *Attorney, Agent, or Firm* — BakerHostetler (57) ABSTRACT

A device for backlighting a liquid-crystal matrix array of a flat screen for viewing in day- or night-vision mode with NVIS compatibility includes a light guide GL which comprises a main cuboid plate shape PP assembled together with at least one right-angled triangular auxiliary prism PA1 which comprises at least one reflective face, and which is arranged together with the main plate to define, on the same lateral face of the plate, two distinct injection windows, one injection window I1 for a nighttime light source and one injection window I2 for a daytime light source. The nighttime light is injected into the plate, by reflection within or off the auxiliary prism in the direction of the respective injection window (I1). The lateral face of the prism that directly receives the light emitted by the nighttime source may comprise an optical filter $F_{NVIS\text{-}c}$ formed collectively over its surface by deposition of dielectric films.

15 Claims, 4 Drawing Sheets

(56) References Cited

U.S. PATENT DOCUMENTS

| | | |
|---|---|---|
| 7,924,371 B1 | 4/2011 | Davis |
| 8,628,206 B1 | 1/2014 | Davis et al. |
| 2005/0248734 A1 | 11/2005 | Chung et al. |
| 2007/0274099 A1 | 11/2007 | Tai et al. |

FOREIGN PATENT DOCUMENTS

| | | |
|---|---|---|
| KR | 2011 0056991 A1 | 5/2011 |
| WO | 2006/043344 A1 | 4/2006 |
| WO | 2016/030217 A1 | 3/2016 |

\* cited by examiner

LIGHTING DEVICE COMPATIBLE WITH NIGHT-VISION EQUIPMENT WITH LATERAL INJECTION WINDOWS FOR DAYTIME AND NIGHTTIME LIGHT

CROSS-REFERENCE TO RELATED APPLICATIONS

This application claims priority to foreign French patent application No. FR 1871860, filed on Nov. 15, 2018, the disclosure of which is incorporated by reference in its entirety.

FIELD OF THE INVENTION

The invention relates to a light-emitting-diode-based lighting device for flat liquid-crystal matrix-array (hereinafter "LC matrix array") viewing screens, which provides two modes for backlighting the LC matrix array, one suitable for using (viewing) the screen by day and the other suitable for nighttime use that is compatible with "NVIS" (night-vision imaging system) equipment such as for example light-amplifying night-vision goggles (NVGs). The invention applies in particular to viewing devices, including head-up displays (HUDs), used in aircraft cockpits.

BACKGROUND

The two, daytime and nighttime, LC-matrix-array backlighting modes each have their own issues. If, in both cases, a good level of backlighting uniformity (i.e. illumination of the entire LC-matrix-array back surface) is sought, since this determines the optical quality of the image, for the daytime mode, there is a need for a white light with very high luminosity in order to provide sufficient contrast with respect to the very high luminosity that, by day, is found inside the cockpit of an aircraft; conversely, for the nighttime mode, little luminous power is needed, but the emission spectrum must be outside the infrared or near-infrared band in order to be compatible with viewing the screen through NVIS equipment such as NVGs.

In the most modern technologies, the light sources are based on light-emitting diodes. The daytime source may thus comprise a set of white light-emitting diodes, or else arrangements of diodes that emit in different colours, for example arrangements of RGB (red, green, blue) diodes, which generally allows better colorimetry to be achieved. The number of diodes used depends on the space available and on the power of the diodes to meet the requirement in terms of luminous power and to best provide uniformity of illumination over the entire back face of the LC matrix array. The nighttime source may use a light source designed to emit in the admissible spectrum. Another known embodiment uses one or more white diodes that are individually or collectively associated with a special filter, known as an "NVIS" filter, which allows the infrared and near-infrared radiation to be filtered out in order to provide, at output, radiation whose spectrum is compatible with the use of NVIS equipment. It is also possible to use arrangements of RGB diodes with an NVIS filter associated with the red diodes.

The invention is more particularly described hereinafter in the context of light-emitting-diode-based light sources, which may be white or coloured, with a suitable NVIS filter for the nighttime source, but the solution of the invention could be applied to other commonly used sources, such as fluorescent or incandescent lights.

The invention relates more particularly to lighting-device architectures using one and the same prismatic light guide to diffuse the light delivered by the two backlighting sources, i.e. the "daytime" light source and the "nighttime" light source.

A prismatic light guide generally takes the shape of a transparent (optically transparent) cuboid plate of low thickness (thin layer) arranged beneath (behind) the LC matrix array of the screen, and the light delivered by each of the backlighting sources is transmitted from the lower face of the guide to be diffused by the upper face of the guide arranged below the plane of the LC matrix array. A corresponding architecture is for example described in applications U.S. Pat. No. 8,628,206 or 7,924,371. There is then a physical intermingling of the daytime and nighttime diodes behind the guide, which is not optimal in terms of daytime-diode density since the nighttime diodes demand greater spacing due to their individual NVIS filtering covers. This configuration is not optimal in terms of bulk either, since to ensure a properly uniform diffusion of light at the output of the prism, the carrier circuit board for the diodes must be placed in a plane that is set quite far back from the guide, the distance by which it is set back increasing with decreasing diode density.

Application EP 0 560 614 proposes another architecture which uses edge lighting for night vision: the diodes of the nighttime light source are placed on an edge of the plate. A gain is thus made in terms of bulk with respect to the preceding architecture: since the spacing of the daytime diodes is less restricted (there is no longer a need to take the bulk of the nighttime diodes into account), the density of the daytime-diode sheet may be increased. However, the setback distance remains around 10 times the thickness of the light guide. For example, with a prismatic light guide a few millimetres thick, the setback distance of the daytime sheet with respect to the back face of the guide will be around 4 to 5 cm.

Moreover, if a standard light guide is used, the diffusion of nighttime light by the diffusing upper face of the guide is not very uniform: nearly all of the light is extracted at the input of the guide. To improve this, the light must be extracted gradually along the entire length of the guide. Guides with an extraction gradient are known, this being achieved for example by using microstructures whose spacing varies along the length of the guide or by varying the thickness of the guide longitudinally (corresponding to the lateral injection direction). However this gradient must be compensated for on the daytime path in order to retain uniform diffusion on the daytime path. This may be achieved using a technique referred to as "local dimming", in which the intensity of current delivered to each diode is adjusted according to its position on the longitudinal light-injection axis. This solution is quite expensive because electronics for adjusting each diode of the daytime light source at least must be included, along with a corresponding calibration step, for a given product or application.

To improve compactness, application WO2016/030217 proposes arranging the daytime lighting diodes in one or more rows along a lateral face of the guide (input face) and envisages incorporating a light guide specifically for the nighttime path, in the form of a thin layer, between this input face and the row of daytime diodes. The function of this specific guide is to extract the light coming from a nighttime lighting diode (with filter) which is injected via a lateral face of this specific guide and which exits therefrom via a plurality of diffusing faces of this guide which are arranged level with and between the daytime lighting diodes. In other words, the technical effect of this specific light guide is to create point sources for diffusion of the nighttime lighting which are scattered among or between the daytime diodes, allowing the light from these "nighttime" point sources to be injected via the same input face of the main light guide as the daytime diodes. In so doing, the problems with physically intermingling the positions of the daytime diodes and and the nighttime-diffusion point sources created by the specific guide are at least partly encountered again. In particular, due to the intermingling of the diffusing faces of the specific guide and of the daytime diodes, the design and placement of this specific guide with respect to the daytime lighting diodes are difficult if it is desired to achieve good uniformity of light diffusion for both modes and sufficient power in daytime mode.

SUMMARY OF THE INVENTION

The invention provides a lighting device that makes it possible to more easily achieve properly uniform lighting with optimized performance on each of the paths, which is based on lighting via the side of a main plate, through an injection window specific to each path delimited by at least one auxiliary prism that is bonded, by one of its faces, to a lateral face of the plate used as the input face. It is shown that it is possible to adjust each path independently of the other according to its specific characteristics, which is favourable in terms of power and uniformity and in that a good degree of compactness is obtained.

To facilitate understanding of the invention, it is worth first recalling the definition of a right prism and of the associated terms used in the present description: a solid having two superposed, identical and parallel polygonal faces, which are generally referred to as "bases", the number of rectangular lateral faces being the same as the number of vertices of the base polygon.

In the invention, the light guide uses a main plate, which corresponds to a right rectangular prism, including a bottom base and a top base (which is the one via which light is diffused as output towards the back face of the LC matrix array to be backlit) and four rectangular lateral faces. The light guide also uses at least one auxiliary prism which is a right-angled right triangular prism, hence with two right-angled triangular bases and three rectangular lateral faces, two of which are at right angles.

This having been specified, the invention provides a side-lighting solution in which the two light sources are placed on the same side, and the lateral face of the main plate used as the main input face is structured heightwise into two light-injection windows, one for each, daytime and nighttime, light source, by at least one auxiliary prism which is a right-angled right triangular prism, at least one of the three lateral faces of which is reflective.

This technical solution, which defines one lateral injection window specifically for each source, makes it possible to optimize each of the, daytime and nighttime, paths, both in terms of compactness and luminous performance, according to its specific characteristics (size, power and minimum spacing of the diodes) without being limited by constraints related to the other path (no intermingling). What is obtained is a lighting device of optimal compactness while also providing high quality of light diffusion via the output face of the guide in each of the two, day- and night-, vision modes.

The invention therefore relates to a lighting device that is compatible with night-vision equipment, which includes a daytime light source used in day-vision mode and formed of at least one row of aligned light-emitting diodes;

a nighttime light source used in night-vision mode, which is formed of at least one row of aligned light-emitting diodes, with an optical filter that is capable of making the light emitted by said light source compatible with the use of night-vision equipment; and a light guide that is configured to diffuse, via a main output face, the light delivered by the current light source according to the current, day- or night-, vision mode, said main output face corresponding to a base of a main plate shape, which is a right rectangular prism, the distance between the two bases of the plate defining a plate height; and the light guide is assembled together with the daytime and nighttime light sources such that the light emitted by each of the sources is injected into the plate along a longitudinal direction thereof via a lateral face of the plate used as the main input face, which is a lateral face of the plate, the lighting device being characterized in that the main cuboid plate shape of the light guide is extended from said main input face, in the longitudinal direction and heightwise with respect to the plate, by at least one auxiliary prism shape which is a right-angled right triangular prism, at least one of the three lateral faces of said auxiliary prism being reflective, and being arranged on the main input face so as there to define, in the heightwise direction, a first window for light injection and a second window for light injection, each window being reserved for one respective light source from the daytime light source and the nighttime light source.

In one embodiment, the two injection windows may be defined on the main input face by means of an auxiliary prism, at least one out of the three lateral faces of which is reflective, and one of the two, unreflective, lateral faces at right angles of which makes surface-to-surface contact with the main input face, such that the covered surface defines a window for the injection of light, by indirect injection, by reflection within the auxiliary prism. In one variant, each of the two windows is defined by a respective auxiliary prism.

In another embodiment, the two injection windows are defined on the main input face by orthogonal projection of one or two reflective lateral faces of an auxiliary prism on the main input face.

The invention thus relates to various arrangements of a prism with one or two reflective faces, or of two prisms each with one reflective face, with a daytime light source and a nighttime light source which may each be arranged on a specific carrier board, or on a common carrier board, each on one respective face.

Advantageously, it is possible to adjust at least one angle between a reflective lateral face and another lateral face, which may or may not be reflective, of an auxiliary prism so as to optimize the distribution of light reflected by the auxiliary prism over the corresponding injection window on the main input face.

Advantageously, the nighttime-source NVIS filter may be formed collectively on a lateral auxiliary-prism face.

Advantageously, the main plate is a plate with an extraction gradient along the longitudinal direction corresponding to the direction of injection of light via the main input face.

BRIEF DESCRIPTION OF THE DRAWINGS

Other features, details and advantages of the invention will become apparent upon reading the following description provided with reference to the appended drawings by way of example, which show, respectively.

DETAILED DESCRIPTION

A lighting device according to the invention suitable for backlighting a liquid-crystal matrix array of a viewing device (flat screen or head-up display (HUD) for example) in daytime mode or in nighttime mode with NVIS compatibility uses a light guide which is arranged together with daytime and nighttime light sources for illuminating the entire back face of the matrix array with the light corresponding to the active (day- or night-) vision mode as uniformly as possible and with the least possible loss of luminance in the light guide. Unless specified otherwise, the daytime and nighttime light sources are conventional light sources, formed by at least one row of light-emitting diodes which are arranged regularly over a carrier board and which emit in a direction orthogonal to the plane of the carrier board (upwards emission). These are white or coloured diodes, with NVIS filtering (white or red diodes) for the nighttime source. These are referred to simply as "diodes" hereinafter.

FIGS. 1 to 10 shown with a reference coordinate system (x, y, z) illustrate a general arrangement and shapes of the various elements of a lighting device according to the invention. These figures do not take the actual respective dimensions of the various elements into account. From one figure to the next, changes in scale for one or all of the elements might have been made to facilitate understanding.

Figure 1:
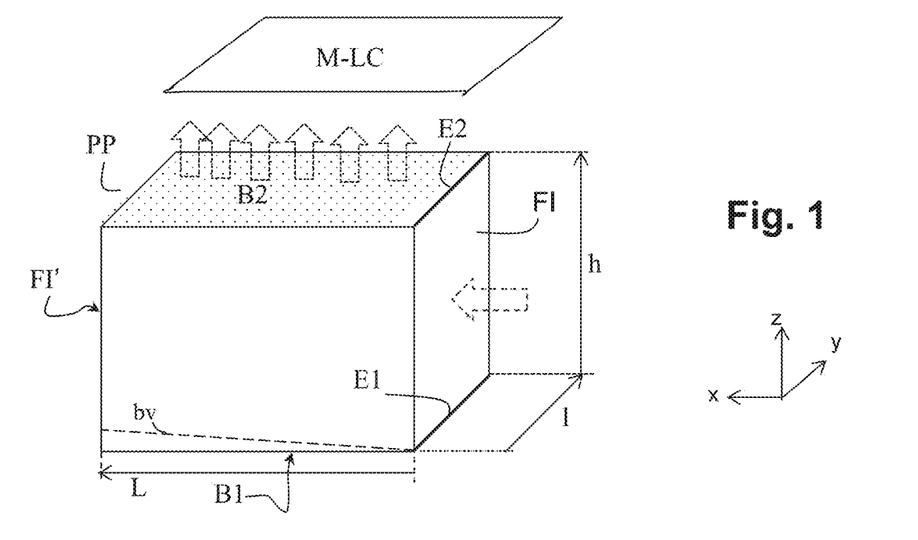
FIG. 1, a schematic perspective view of a light-guide main cuboid plate.

A light guide according to the invention comprises a main plate PP, which is schematically shown in FIG. 1. The main plate PP corresponds to a right rectangular prism, the dimensions I×L of the base rectangle (where I≤L) are defined so as to be at least equal to, and generally larger than, those of the matrix array M-LC to be backlit (symbolically represented in FIG. 1 by a rectangular surface), and the distance between the bases of which corresponds to the thickness, or height, of the plate. This thickness is generally constant, but it will be seen below that, in certain cases, to promote a more gradual extraction of light, this thickness may vary along the axis x, corresponding to the back of the plate being cut to a taper (dashed cutting line v in FIG. 1). The dimension L along the axis x corresponds to the longitudinal direction of the plate, which, in the invention, is the direction of injection of light into the plate via a lateral injection face denoted by FI, referred to as the input face hereinafter. The dimension I runs along the axis y and corresponds to the width of the input face FI. Hereinafter, the general case of rectangular bases where I≤L, I and L corresponding to the small side and to the large side of the rectangle, respectively, will be used, this covering the particular case of square bases. All that follows applies equally to a constant or variable thickness. Specifically, the invention pertains more particularly to producing two independent optical injection paths on one and the same input face of the main plate, of height h.

By way of indication, the height h of the plate (thin layer) is generally of a few millimetres (3 or 4 millimetres for example) while the width I and the length L depend, as seen, on the area of the matrix array to be backlit, and range from a few centimetres for small matrix arrays to several tens of centimetres for the largest.

The arrangement of the plate PP with respect to the liquid-crystal matrix array to be backlit M-LC corresponds to that of the prior art. In particular, the top base B2 is a diffusing face (for example a matte face) which is placed immediately beneath the back face of the matrix array M-LC. It forms the output face of the light guide, via which the light from the active (daytime or nighttime, depending on the current vision mode) light source, which is injected in a longitudinal direction via a lateral face of the plate, is diffused as uniformly as possible over the entire back face of the liquid-crystal matrix array. The bottom base B1 and the three other, lateral faces are reflective faces (i.e. faces with high albedo). These faces are for example polished or covered with a white film. Additionally, it is sought to have good uniformity of light diffused at the output of the light guide. This may be achieved using light-guide technology that allows scattering particles to be incorporated within the bulk. Preferably however, a plate designed to possess a gradient in the direction of injection of light is used. Details on this type of plate are given further on in the description.

The light guide according to the invention is designed for lateral injection of light via only one lateral face of the cuboid plate PP, which is that denoted by FI in the drawings. In the example, it is a face that runs heightwise h (between the two bases) across the width I which corresponds to the small sides (I) of the base rectangles. However, the invention applies in the same way when the chosen input face is a face that runs across the width L corresponding to the large sides (L) of the bases (it is simply a matter of inverting the roles of I and L in the explanations below).

Figure 2:
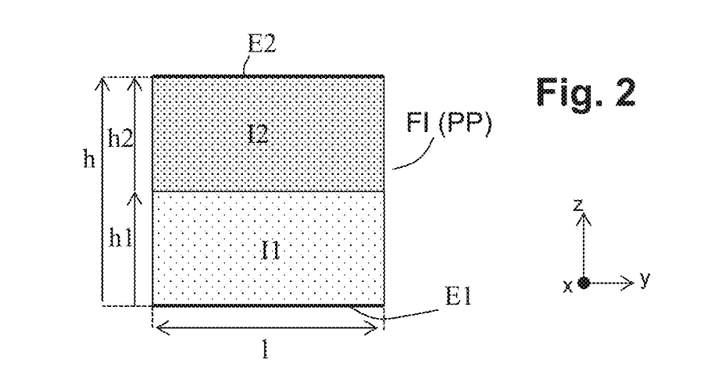
FIG. 2, two injection windows defined on a lateral face of a light-guide main cuboid plate according to the invention.

According to the invention and as illustrated in FIG. 2, the input face FI is structured into two injection windows I1 and I2 that are defined heightwise h (axis z), defining one injection window per light source. The two injection windows I1 and I2 have respective heights h1 and h2 and preferably span the entire width I of the face FI. They are obtained by using at least one auxiliary prism which is a right-angled right triangular prism and which is used as a stage for indirectly injecting light by reflection for at least one associated light source according to the implementation of the invention. More specifically, according to the implementation of the invention, the reflection by the auxiliary prism is a reflection within the prism (the light emitted by the source is transmitted into the interior of the prism) and in this case one corresponding (indirect) injection window is the surface of the main input face which is covered by one of the, unreflective, lateral faces at right angles of the auxiliary prism which makes surface-to-surface contact with this main input face; otherwise, the reflection is a reflection off the auxiliary prism (the light emitted by the source does not penetrate into the prism) and in this case one corresponding (indirect) injection window is the surface of the main input face corresponding to an orthogonal projection of the reflective face which is arranged in an inclined plane facing the main input face. The other injection window may be the remaining surface, and it is then used in direct light-injection mode for the other light source. Otherwise it is defined, like the first injection window, by a respective auxiliary prism or a reflective face of a respective auxiliary prism, used in the mode of indirect light injection by reflection. These various possibilities will be explained in detail with the aid of the figures.

The invention makes it possible to define two independent optical paths heightwise with respect to the plate and each path may thus be optimized without having to account for constraints or emission characteristics of the other path.

For the most efficient injection possible, optimizing the useful injection area on the plate, it is envisaged that the two injection windows between them cover the entire area I×h of the main input face FI (of the main plate).

Figure 3:
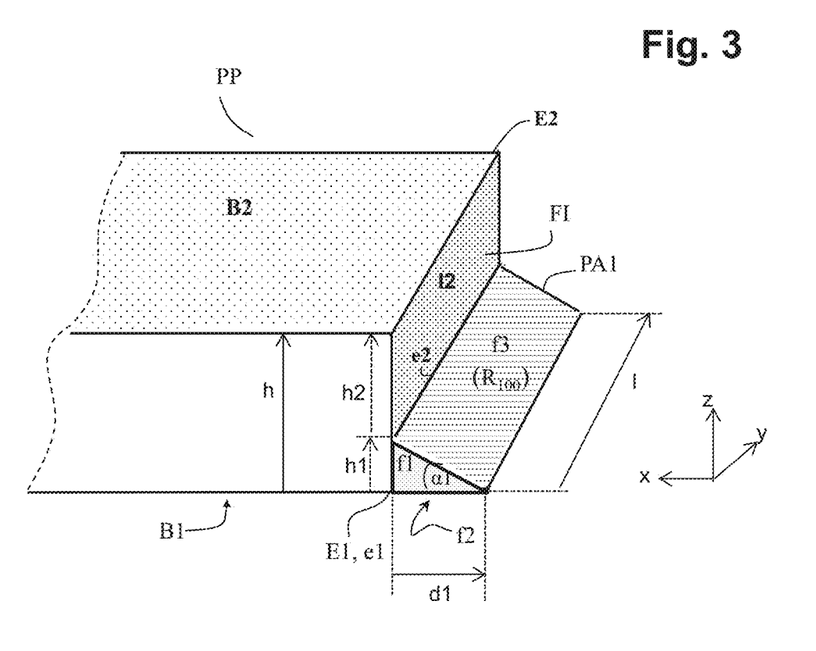
FIG. 3, a schematic perspective view of a light guide formed of a main cuboid plate and of an auxiliary prism bonded to a lateral face according to one embodiment of the invention so as to form two injection windows, one per light source.
Figure 4:
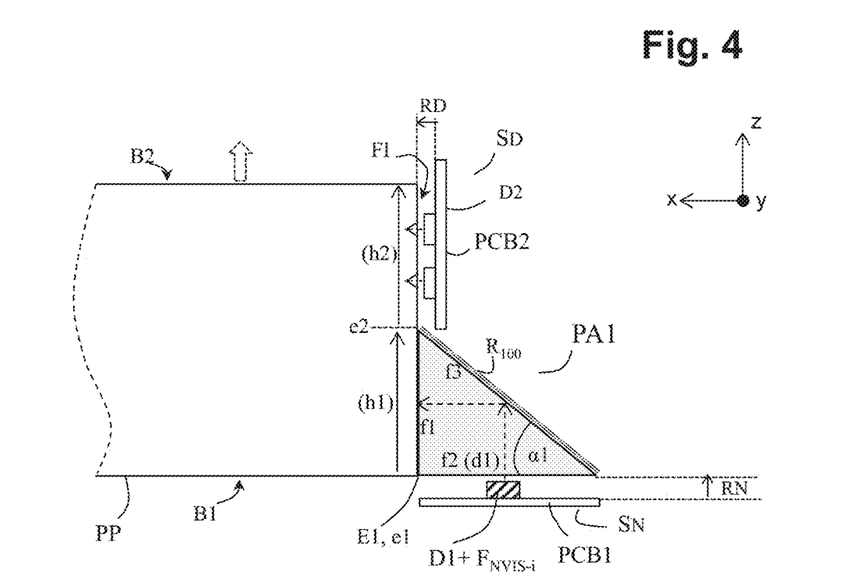
FIG. 4, a schematic sectional view of a corresponding arrangement with the daytime and nighttime light sources, in an example in which the injection windows are substantially equal in height.

FIGS. 3 and 4 illustrate a first implementation of the invention, in which a single auxiliary prism PA1 is used to define both injection windows on the main input face. One of the two lateral faces at right angles serves as the input face and the other as the output face. The one used as the output face, which makes surface-to-surface contact with the input face FI, is denoted by f1: it defines (delimits) the first injection window I1 which corresponds to the covered surface. This zone I1 therefore stretches across the input face FI over a height h1 (axis z) which corresponds to the distance between the edge e1 of the auxiliary prism between the two lateral faces at right angles f1 and f2 and the edge e2 of the auxiliary prism between the first lateral face f1 and the third lateral face f3. The zone I1 runs along the axis y and preferably across the entire width I of the face FI. In other words the height (or thickness) of the auxiliary prism, which is the distance between its two bases, preferably corresponds to the width I of the input face of the plate.

Preferably, to optimize the use of the input surface FI on the main plate for light injection, the prism PA1 is bonded to this face FI, from edge to edge on two sides with respect to the input face of the main plate, as illustrated. In particular, the edge e1 between the two faces f1 and f2 of the prism PA1 is aligned (coincides) with the edge E1 of the plate PP between the base B1 and the input face FI. However, it could just as well be aligned on the opposite edge, with the edge E2 of the plate between the top base B2 and the input face FI.

The auxiliary prism PA1 defines (delimits) the second injection window I2 on the input face FI, which is the remaining (uncovered) surface on this face FI between the auxiliary prism and the other edge of the plate. This second zone I2 stretches for example over a height h2 which corresponds to the distance from the edge e2 of the auxiliary prism PA1 to the edge E2 of the plate PP.

This first implementation results in a lighting device in which one light source is associated with the first injection window I1 of the input face of the main cuboid plate for "indirect" injection of light by reflection within the auxiliary prism, while the other source is associated with the second injection window I2 for "direct" injection of light via this input face FI, in the longitudinal direction of the plate.

The second, "direct" injection window is preferably associated with the daytime source $S_D$ since it is this mode which requires a large amount of luminous power. FIG. 4 shows a corresponding arrangement of the light sources and of the light guide. The carrier board PCB2 for the daytime source $S_D$ is arranged in a parallel plane facing the second injection window I2, preferably centred and as close as possible with respect thereto, such that the area of zone I2 captures as much of the daytime radiation as possible (divergence of the diodes). The daytime source is thus located to the side of the plate, in the continuation of the plate in the longitudinal direction over the height h2.

The nighttime light source $S_N$ is associated with the auxiliary prism PA1 for indirect injection by reflection within the prism in the direction of the injection zone I1 on the input face FI. The carrier board PCB1 for this source is arranged in a parallel plane facing the input face f2 of the auxiliary prism, preferably centred and as close as possible with respect thereto to allow the transmission of as much radiation as possible (divergence of the diodes). The light from the source $S_N$ travels in a direction that is orthogonal (along y) to the plane of face f2; it is reflected in the longitudinal direction with respect to the main plate (along x) towards the corresponding injection window I1 (output face f1) by the third lateral face f3 of the auxiliary prism, which is 100% reflective (mirror face). To this end, the face f3 features a surface coating $R_{100}$ which is deposited (laminated) on or bonded to this face f3. By way of nonlimiting example, the structure $R_{100}$ is an assembly of metal or dielectric thin films.

The two light sources are each arranged on a specific carrier board (PCB1 for $S_N$, PCB2 for $S_D$), which lie in orthogonal planes with respect to one another. As mentioned, each carrier board is preferably placed as close as possible to the respective input face, at a mounting distance that takes into account the mechanical-mounting, heat-dissipation and connection constraints dictated by the specifications of the application. In practice, this mounting distance ($_{RD}$ for the daytime source, $_{RN}$ for the nighttime source) is not more than a few millimetres, and is generally between 0.2 and 2 millimetres.

For each source (on each optical path), the arrangement and number of diodes, and the mounting distance, depend only on the characteristics of the diodes used for this source (power, dimensions, emission cone), on the diffusion area available on the respective input face (in this example, I×h2 for the zone I2 associated with the daytime source and I×h1 for the face f2 associated with the nighttime source) and on the assembly constraints (mechanical, thermal, connection constraints) at the site in question.

Each optical path may therefore be optimized (centring, mounting distance, arrangement and number of diodes) independently of the other path so as to allow optimal transmission of luminous power towards/into the main plate.

In addition to being compact and inexpensive, the proposed arrangement is also advantageous in terms of heat dissipation and connections, in particular for connection to other boards (control electronics).

In practice, the dimensions of the auxiliary prism PA1 depend on the dimensions of the main input face FI. The width I of the input face FI defines the maximum (useful) height or thickness of the auxiliary prism between its two triangular bases and consequently the length of the rectangular faces f1, f2 and f3. Preferably, the thickness of the prism is chosen so as to be equal to this value I so that the corresponding injection window I1 is as wide as possible. The height h of the input face FI determines the respective values h1 and h2 of the two injection windows I1 and I2. It is not mandatory for the values h1 and h2 to be equal, but they may be so (e.g. FIG. 4). These values are such that, for each source, it is possible to position (centre) at least one row of diodes facing the respective main (daytime source) or auxiliary (nighttime source) input face. When the heights h1 and h2 are not equal (e.g. FIG. 3), the ratio of the greatest to the smallest will generally not be greater than 2, and the greatest will generally be that associated with the daytime source for which it is desired to incorporate the most diodes possible in order to have the greatest amount of luminous power possible.

Regarding the angle α1, it is in principle equal to 45 degrees (π/4) but it may advantageously be adjusted, by a few degrees either way, by modifying the width d1 of the face f2 in order to account for the characteristics of the emission cones of the light-emitting diodes used (or more generally of the emissive elements used) with a view to optimizing the distribution of light over the auxiliary output face f1. In other words it is possible to optimize the orientation of the reflective surface according to the characteristics of the source (of the diodes) allowing the most divergent beams (from the source) to be brought back in line with the longitudinal central axis of the main plate. The typical value of the angle α1 is 45°, corresponding to h1=d1. If the angle must be increased slightly then d1 must be decreased slightly, and vice versa. In other words, d1=h1±δ1.

For plates a few millimetres thick, d1 and h1 have values of a few millimetres (for example 2 to 3 millimetres) and δ1 is either zero or equal to a few tenths of a millimetre. A few numerical (nonlimiting) examples are given. In a first example, the plate PP is 4 millimetres thick (h) and the heights h1 and h2 are each 2 millimetres. Then, for a value α1 of 45 degrees, d1=h1=2 mm (tangent function). If, for a given application, according to the diodes used, it is desired to adjust al to 42 degrees, then d1 will be set to 2.22 millimetres. In another example, the plate PP is 6 millimetres thick, and h1 is 2 millimetres and h2 is 4 millimetres. This chosen ratio may allow the density of the daytime-diode sheet to be increased, for example with a staggered arrangement of diodes. If an optimal angle value for al is 48 degrees, then the value of d1 is set to 1.80 millimetres.

Regarding the mounting of the sources, each source is mounted on a carrier board that is specific thereto, at a mounting distance as close as possible thereto, and centred in relation to the respective input face so as to obtain the best distribution of light over this input face with the least possible loss of luminous power. In practice, if diodes D2 (daytime source) which are individually encapsulated (individual protective housing) are used, and for the values h1 and h2 given in the example, then, for the daytime source, there will be at least one row over the height h2 of the injection window I2. In each row, the diodes D2 run (are aligned) across the width I of the zone I2. Since a maximum diode density is sought here, more rows may be envisaged, at least two with a staggered arrangement of diodes, depending on the value of h2 and on the diodes used (size, minimum required spacing). It should be noted that it is possible to use bare chip diodes instead of bulkier encapsulated diodes (individual protective housing). The nighttime source is centred with respect to the area d1×I of the auxiliary input face f2 (FIG. 4). It may comprise a single diode D1, but it is also possible to envisage a row of diodes D1 arranged along the length I of the face f2.

Figure 5:
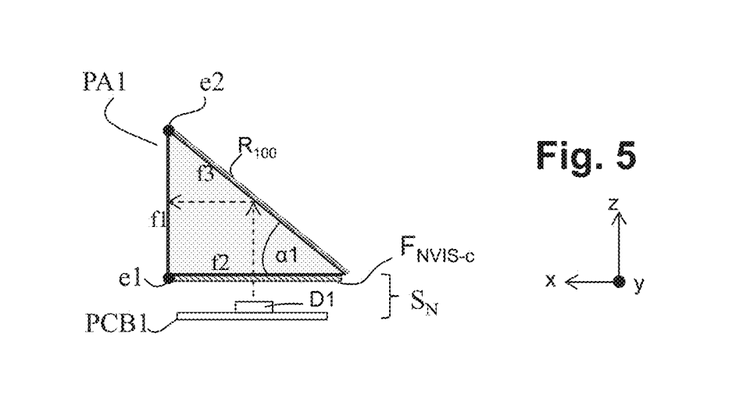
FIG. 5, a schematic sectional view of an auxiliary prism of a light guide according to the invention which is configured to perform collective NVIS filtering for the nighttime light source.

FIG. 5 illustrates a refinement that is applicable to the nighttime optical path allowing the production cost thereof to be decreased and contributing to improving the compactness of the device. According to this refinement, the NVIS filtering cover $F_{NVIS-i}$ (FIG. 4), which must be placed individually over the diodes D1 of the nighttime source (white diodes or red diodes) is replaced with a collective filter formed on the input face f2 of the auxiliary prism. Such a collective filter NVIS-c may be formed in practice by depositing or bonding a dielectric thin-film structure on or to this face. The production cost is decreased (collective process and deposition of thin films versus individually placed cover) and the nighttime source may be mounted closer to its respective input face, which is advantageous for light transmission (fewer losses).

This first implementation necessitates mechanically incorporating one source carrier board vertically (with respect to a horizontal LC-matrix-array plane) and mechanically incorporating another source carrier board horizontally, which is not always optimal in terms of heat dissipation and connections for the overall device.

Figure 6:
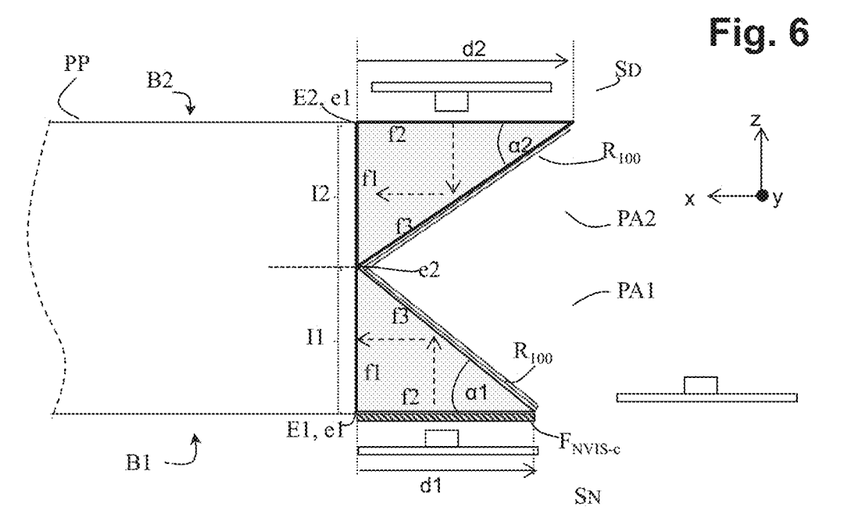
FIGS. 6 and 7, schematic sectional and perspective views of a lighting device with a light guide according to a second embodiment of the invention.
Figure 7:
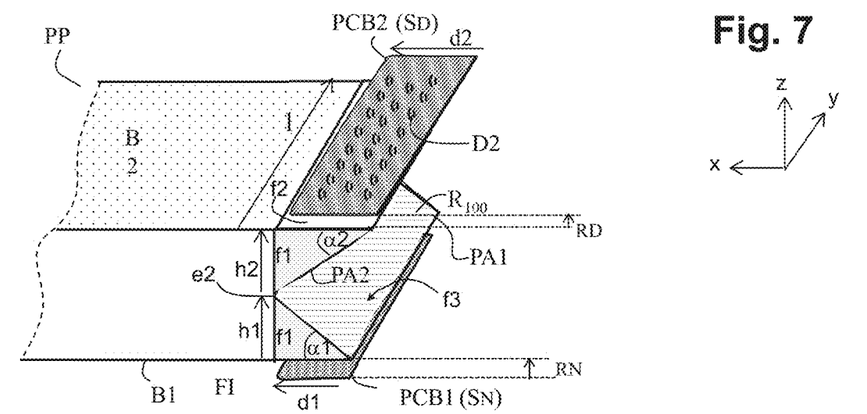

FIGS. 6 and 7 illustrate a second implementation of the invention which allows the two source carrier boards to be mounted horizontally in superposed parallel planes on either side of the guide. Each injection window is here defined on the input face FI by a respective auxiliary prism, and each auxiliary prism serves as an input stage for an associated light source.

In the example illustrated, the nighttime light source is associated with the auxiliary prism PA1 and arranged on the same side as the bottom base B1 of the main plate PP, and the daytime light source is associated with the auxiliary prism PA2 and arranged on the same side as the top base B2. However, it would be just as possible for the arrangement to be inverted.

The general shape of the auxiliary prism PA2 and the function of the lateral faces (input, output, reflective function) for the associated light source are the same as those of the auxiliary prism PA1 described in the first implementation. As such, the same references are used in the drawings to denote the lateral faces (f1, f2, f3) and the edges (e1, e2) of the auxiliary prisms PA1 and PA2. The respective dimensions of the prisms PA2 and PA1 are h2, d2 and I and h1, d1 and I, where I corresponds to the width of the input face FI of the main plate and defines the maximum height of each of the auxiliary prisms, which is also the length of their faces f1, f2, f3. Each source is placed centred in relation to the respective auxiliary input face f2 on the associated auxiliary prism. Here, with respect to the first implementation, the arrangement and number of diodes D2 of the daytime source are defined with respect to the area I×d2 of the auxiliary input face f2 of the prism PA2. In this example, three rows of diodes in a staggered arrangement are shown, which may correspond to the use of bare chips.

Preferably, the two prisms are arranged on the input face FI of the main plate so as to effectively use the entire available area for light injection. This defines the height of the prisms PA1 and PA2, which is equal to I, and, preferably, the entire height of the main input face (of the plate PP) is used. The faces f1 of the prisms are thus arranged from one side to the other across the face FI such that the second edge e2, between their faces f1 and f3, is common to both prisms. The injection window I1 runs along the input face FI over the height h1 defined by the distance between the two edges e1 and e2 of the prism, preferably starting from the edge of the plate: in this example, the edge e1 coincides with the edge E1 of the main plate (edge-to-edge assembly). In a similar manner, the injection window I2 delimited by the auxiliary prism PA2 runs along the input face FI over a height h2 between the edges e1 and e2 of the prism PA2, preferably starting from the plate edge (edge-to-edge assembly, coincident edges e1 and E2).

The dimensions h2, d2 and α2 of the prism PA2 are defined or constrained in the same way as the dimensions h1, d1 and α1 of the auxiliary prism PA1. In other words, all that has been stated above in this regard for PA1 with reference to FIGS. 3 to 5 applies in the same way for PA2. In particular, it is possible to adjust the angle value between the faces f2 and f3 for each auxiliary prism in order to optimize the distribution of light at the plate input. To achieve this, the widths of the input faces f1 (d1 for PA1, d2 for PA2) are adjusted, i.e. d1=h1±δ1 and d2=h2±δ2. If the values h1 are equal to a few millimetres, for example between 2 and 4 mm, the value of δi ranges from zero (αi=45 degrees) to a few tenths of a millimetre (adjustment by a few degrees). Reference may be made to the numerical examples given for the first implementation. As above, each, daytime and nighttime, light path may thus be optimized separately according to the application and the diodes used, according to the mounting distance and the dimensions of the respective auxiliary prism.

In terms of producing a light guide according to the first or the second implementation in practice, there are various possibilities. The form of the light guide including the shape of the main plate and that of at least one auxiliary prism, or both auxiliary prisms, may be formed as one part (moulding, etching). By way of nonlimiting example, it is possible to produce:

- a monolithic part shape (moulding, etching) for the main plate and an auxiliary prism. This part may be used in a lighting device according to the first implementation and, for the requirements of another application, it is possible to add to the part by attaching a second prism corresponding to the second implementation by bonding.
- a monolithic part shape (moulding, etching) for the main plate and two auxiliary prisms corresponding to the second implementation.
- a cuboid plate shape and a monolithic shape corresponding to the two auxiliary prisms arranged on a base in the shape of a cuboid plate that is very short (along the longitudinal axis, x) with dimensions I and h corresponding to those of the main plate, allowing the base to be attached surface-to-surface to the main input face of a plate.

Figure 8:
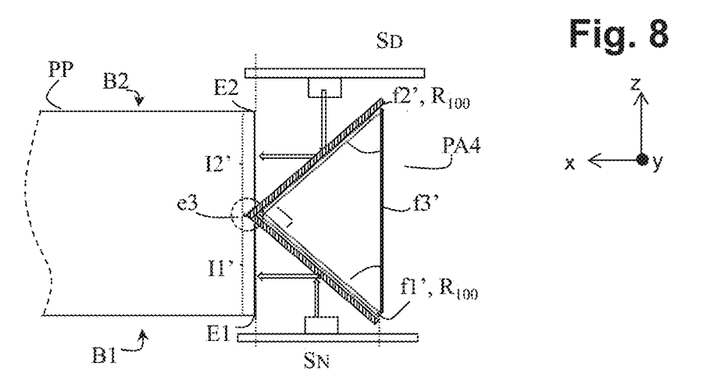
FIG. 8, a schematic sectional view of one variant implementation of the second embodiment of the invention.

FIG. 8 illustrates one variant embodiment of the implementation corresponding to FIGS. 6 and 7, which uses an identical arrangement of the carrier boards for the sources but with a single auxiliary prism PA4 with two reflective faces: these two faces are the two lateral faces at right angles of the prism, denoted by f1' and f2', and their placement in the arrangement corresponds to the placement of the reflective faces f3 of the prisms PA1 and PA2 in FIG. 6. The shape PA4 corresponds, after a fashion, to the complementary shape which slots into the shape formed by the two prisms PA1 and PA2 in FIG. 6, resulting in a cuboid. In this variant, the two faces f1' and f2' are then each covered by a reflective surface coating R100.

In this variant, the light emitted by the light sources does not pass through the auxiliary prism: it is received directly by the reflective face of the auxiliary prism and reflected by this face towards the respective injection window. Here, the respective injection windows, I1 and I2, each correspond to the area of the orthogonal projection of the corresponding reflective face of the auxiliary prism on the main input face.

The border between the two windows corresponds to the position of the edge e3 between the two reflective faces f1' and f2'.

In practice, it is envisaged that, in terms of area of the main input face, the prism area has a certain width in order to provide the guide with mechanical strength. If the plate and the prism are assembled together by bonding, this may be achieved, for example, by machining or moulding an auxiliary prism shape such that the edge e3 of the auxiliary prism is not sharp but instead exhibits a small flat area (chamfer), or by machining or moulding a plate shape so as to have a v-shaped notch that corresponds to the edge so as to allow it to slot in (FIG. 8).

Additionally, the face which receives the radiation emitted by the night-time source (f1' in this example) preferably includes, as illustrated, a dielectric thin-film structure forming a collective optical filter $F_{NVIS-c}$. The choice of layers for producing the interference filter differs from that of the arrangements in the preceding figures since the filter is here passed through twice: once on the optical path for the nighttime source in the direction of the reflective face and a second time on the optical path from the reflective face in the direction of the input face of the main plate. This filter is in addition to the reflective surface coating $R_{100}$. It should be noted that it is advantageously possible to produce a dielectric surface coating that performs both the mirror function and the desired NVIS filtering function (dielectric mirror with spectral reflectance). Otherwise, dielectric layers performing the NVIS optical-filter function are deposited on the metal layers of the reflective coating.

In the embodiments of the invention that were described with reference to FIGS. 3 to 8, the two light sources are each arranged in the lighting device on a specific carrier board, which assumes a specific mechanical mounting.

A third implementation of the invention allows in particular the arrangement of the light guide and of the sources to be made more compact and facilitates accounting for the heat-dissipation and connection constraints because it allows the two sources to be incorporated on one and the same carrier board.

Figure 9:
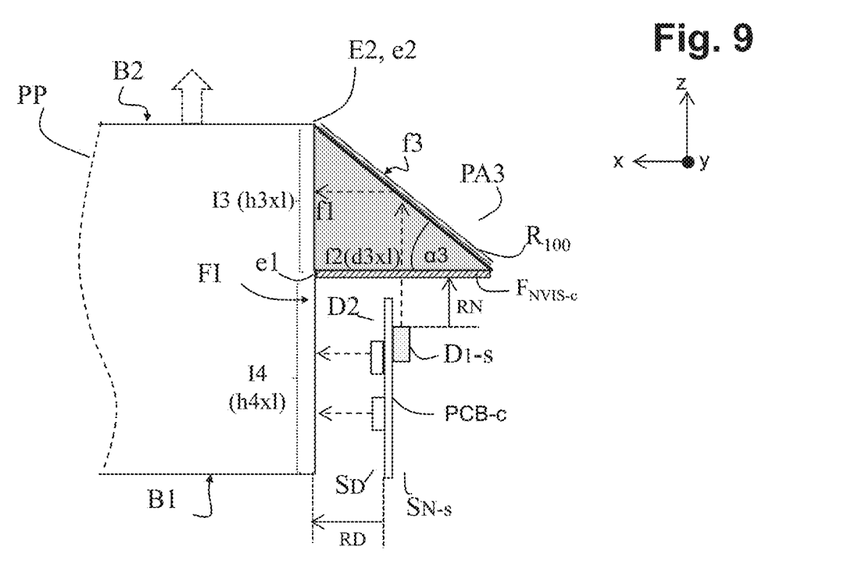
FIG. 9, a schematic sectional view of a lighting device with a light guide according to a third embodiment of the invention.

This implementation is illustrated in FIG. 9. A single auxiliary prism, denoted by PA3, is used, which is bonded surface-to-surface to the input face FI of the main plate and positioned such that it is the edge e1 between the faces f1 and f2 of the prism PA3 which delimits the two injection windows heightwise (instead of the edge e2 between the faces f1 and f3, as in the first two implementations). It is recalled that throughout the description, and hence here as well, the references f1, f2, f3, e1 and e2 have the same meaning in all of the auxiliary prisms. For the dimensions that may be adjusted, special references are used: d1 and α1 for PA1 (FIGS. 3 to 7), d2 and α2 for PA2 (FIGS. 6 and 7) and d3 and α3 for PA3 (FIG. 8). The references for the two injection windows formed by the prism PA3 are I3 with height h3 and I4 with height h4. Here, these windows are defined by a different arrangement of the auxiliary prism with respect to the plate.

In the example illustrated, the prism PA3 is arranged on the top-base B2 side, such that the edge e2 between its faces f1 and f3 coincides with the edge E2 (or is close to E2) of the main plate (between B2 and FI). Thus positioned, the face f1 of the auxiliary prism PA3 defines an injection window I3 that spans a height h3 corresponding to the width of this face f1, between the edges e1 and e2, and preferably, as illustrated, starting from the edge of the plate (from the edge E2). The edge e1 defines the limit with the second injection window I4, which is the remaining area on the face FI, i.e. that left free of the prism PA3. This zone I4 spans a height h4 from level with the edge e1 to the other edge of the plate (E1, B1).

This third implementation of the invention allows both light sources to be placed on one and the same carrier board PCB-c. This board may be positioned heightwise h4 in the free space below the auxiliary input face f2 of the prism PA3 and in a plane parallel to and facing the second injection window I4 defined on the input face FI of the plate, a first light source being mounted on the front face of the carrier board directly facing the injection window I4, for direct injection through the main input face, and the second being mounted on the back face for indirect injection via the auxiliary prism, through the injection window I3 defined on the main input face. In other words there is a gain in terms of compactness, the common carrier board (with both sources) being able to be incorporated within the continuation of the plate, vertically, at the height h4 below the auxiliary prism.

With regard to mounting the sources, the centring and mounting-distance aspects described for the preceding implementations are used. The first light source on the front face of the common carrier board PCB-c is arranged (its diode sheet) advantageously centred with respect to the injection window I4 (I×h4) on the input face FI, as close as possible to this face FI according to the (mechanical, thermal, connection) mounting constraints. The first light source is preferably the daytime source since direct injection minimizes luminous-power losses and the diodes are top-emitting diodes, which are better in terms of luminous power.

The second light source, which will generally be the nighttime source, is arranged on the back face of the common carrier board. It uses one or more side-emitting diodes D1-s, which emit in a direction parallel to the carrier-board plane. It is possible to have a single diode D1-s, which is then positioned on the back face of the carrier board centred with respect to the auxiliary input face f2 of the prism PA3; however, it is possible to envisage a row of diodes D1-s that is positioned centred with respect to the width d3 of the face f2 with a row of diodes along the length l of the auxiliary input face f2.

Like in the other implementations, the angle $\alpha 3$ between the faces f2 and f3 of the prism PA3 has a typical value of 45 degrees, which may be adjusted by a few degrees in either direction by modifying the width d3 of face f2 of the prism PA3 in order to obtain a uniform distribution of the light emitted by the source $S_{N-s}$ over the entire extent of injection window I3 defined on the main input face FI. Additionally, and as illustrated, the NVIS filtering may be performed by a collective filter $F_{NVIS-c}$ on the auxiliary input face f2 (structure $R_{100}$).

Lastly, the auxiliary prism may just as well be placed on the bottom-base B1 side (all other things being equal). A person skilled in the art will be able to carry out the corresponding transpositions. The choice of arrangement with respect to the bases B1 and B2 depends mainly on the (mechanical, thermal, connection) mounting constraints for vertically incorporating the sources.

Figure 10:
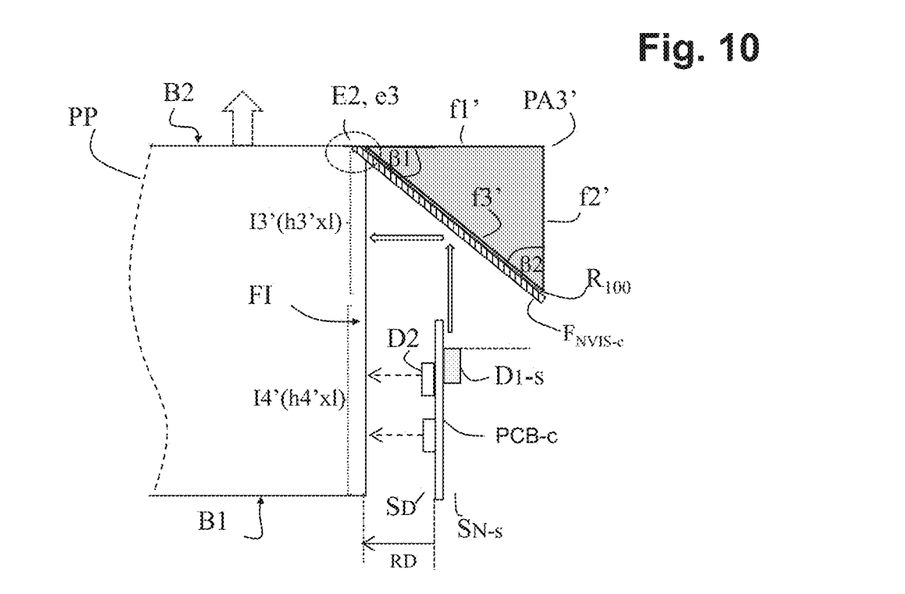
FIG. 10, a schematic sectional view illustrating one variant of this third embodiment.

In one variant illustrated in FIG. 10, it is the face f3' that connects the two faces at right angles of the auxiliary prism PA3' which is reflective, the prism being placed such that this face f3' is in a plane that is inclined with respect to and facing the main input face FI. The face f3' defines a first injection window I3' on the main input face FI which corresponds to the area of orthogonal projection of the face f3'. In this example, one of the faces at right angles, f1' in the figure, extends, in the same plane, one base of the plate, B2 in the figure, and the other face at right angles, f2', lies in a plane that is parallel to the input face of the plate, on the outer side of the guide. That which has been explained for the variant of FIG. 8 regarding the mechanical-strength aspect via a suitably shaped auxiliary prism (chamfer) or plate (notch) applies in the same way, as does that regarding the formation of a collective filter $N_{VIS-c}$ for the nighttime path on the reflective face f3'.

Equally, it is possible to envisage adjusting auxiliary-prism angles to optimize the distribution of light over the respective injection window I3' on the input face of the main plate. In other words, all that has been explained above for angle adjustments applies here too. In this example, the angle between the reflective face f3' and the face f2' that is arranged vertically (in the plane of the figure) is modified to achieve this optimization.

With regard to the daytime and nighttime light sources, they are arranged in the same way as for the embodiment of FIG. 9, on a common carrier board that is arranged vertically at the height of the second injection window, which corresponds to the remaining area on the main input window. In this arrangement of FIG. 10, like for that of FIG. 8, the light emitted by the associated source (preferably the nighttime source, as illustrated) does not pass through the auxiliary prism; in other words, there is an indirect injection of (nighttime) light into the plate by reflection off the prism (and not within the prism as for the other embodiments from FIGS. 3 to 7 and 9).

Whichever embodiment is implemented, the light guide according to the invention is easily produced using prior-art techniques. It may in particular be produced as one part, by machining (polishing, etching) glass or moulding an optical plastic material. The reflective coating $R_{100}$ of the face f3 (solution with one auxiliary prism) or of the faces f3 (solution with two auxiliary prisms) and the collective NVIS filter on the face f2 of the auxiliary prism associated with the nighttime source are next produced by means of thin-film deposition techniques. It is also possible to envisage producing the various elements (the main plate and the one or more auxiliary prisms of the guide) from identical or compatible materials separately and then assembling these elements together by bonding. A few examples of this have been given throughout the description. These examples and the resulting variants come within the scope of the invention. Depending on production technique, the dimensions or the relative positions of the various elements (main plate, auxiliary prism(s)) may vary.

Next, the light sources and the light guide are mechanically assembled together to form the lighting device according to the invention while observing the mounting and centring constraints. This assembly process uses techniques that are common in the prior art.

With regard to the main plate, it must allow good uniformity of light diffusion to be obtained. The plate could be produced using technology in which scattering microparticles are incorporated within the bulk. However, the diffusion obtained with lateral injection is generally not optimal.

To obtain, at the output of the guide, backlight lighting that is optimal in terms of power and uniformity whichever path (daytime or nighttime) is active, a main plate with a light extraction gradient along a longitudinal direction corresponding to the direction of injection of light via one of the lateral faces of the plate, allowing extraction to be made uniform along the length of the plate, will advantageously be used.

Such plates are known to a person skilled in the art. For example, the plate comprises microstructures formed by means of surface treatment (the lower face and/or upper face) or else within the bulk, and the size of the microstructures and/or the spacing between them varies so as to obtain the desired extraction gradient along the direction of injection. The function of these microstructures is to interrupt the geometry or the air/transparent-material interface of the plate. The microstructures may for example (and nonexhaustively) be microstrips that are oriented orthogonally with respect to the direction of light injection and get closer together the further they are from the lateral input face, microdots deposited by screenprinting diffusing paint on the back face, surface microholes (or bumps) or microprisms on the front face. In this case, the gradient function is synthesized by the variations in size and/or position of the microstructures. It is also possible to produce an extraction gradient by varying the thickness of the plate along its length. For example, the back face of the plate may be cut to a taper (which option is represented in FIG. 1 by the dashed line bearing the reference bv).

In this case, the height of the main lateral input face, used for injection, is the initial plate height h, and this height decreases gradually with increasing proximity to the opposite lateral face. It is also possible to combine a variation in thickness over the length of the plate with microstructures.

The invention is also compatible with the use of the technique of current-controlling each diode individually (local dimming), in particular for the daytime path.

Additionally, for the embodiments described in which the light is injected indirectly by reflection within an auxiliary prism (FIGS. 3 to 7 and 9), it is possible to improve the coupling/compensate for the lengthening of the optical path due to the journey through the prism by preferably adding, to the input or output face of the prism, a microprism film known as a BEF (brightness enhancement film) in order to tighten the light beam in the direction of the thickness of the guide.

Lastly, a lighting device incorporating a light guide according to the invention is suitable, as seen, for light-emitting-diode-based light sources, which may be white diodes but also coloured light-emitting diodes, typically red, green and blue diodes, which allow better colorimetry to be achieved, etc.

The main advantages of an NVIS-compatible lighting device with two, day- and night-, vision modes according to the invention are:
a good degree of compactness. In particular, the thickness of the assembly of one or more auxiliary prisms and sources is not that different from the thickness of the main plate;
facilitated mechanical integration, including in terms of heat management and connections (to other boards);
optical independence of the two emission paths, which allows better optimization of each path (there is no need to make tradeoff in performance between the two paths).

All of these advantages further contribute to decreasing the overall cost for producing the guide and incorporating the sources.

The invention claimed is:

1. A lighting device compatible with night-vision equipment, including
a daytime light source ($S_D$) used in day-vision mode and formed of at least one row of aligned light-emitting diodes ($D_D$);
a nighttime light source ($S_N$) used in night-vision mode, which is formed of at least one row of aligned light-emitting diodes ($D_N$), with an optical filter that is capable of making the light emitted by said light source compatible with the use of night-vision equipment; and
a light guide (GL) that is configured to diffuse, via a main output face, the light delivered by the current light source according to the current, day- or night-, vision mode, said main output face corresponding to a base (B2) of a main shape of a plate (PP), which is a right rectangular prism, the distance between the two bases of the plate defining a plate height; and
the light guide is assembled together with the daytime and nighttime light sources such that the light emitted by each of the sources is injected into the plate along a longitudinal direction thereof via a lateral face of the plate used as the main input face (FI), which is a lateral face of the plate,
wherein the main shape of the light guide is extended from said main input face, in the longitudinal direction and heightwise with respect to the plate, by at least one auxiliary prism shape (PA1), which is a right-angled right triangular prism, at least one of the three lateral faces of said auxiliary prism being reflective, and being arranged on the main input face (F1) so as there to define, in the heightwise direction, a first window (I1) for light injection (I1) and a second window (I2) for light injection (I2), each window being reserved for one respective light source from the daytime light source and the nighttime light source.

2. The lighting device according to claim 1, wherein the first (I1) and second (I2) injection windows are defined by an auxiliary prism (PA1), only one face of the three lateral faces of which is reflective, said prism being arranged such that
a first lateral face (f1), which is one of the two lateral faces at right angles, is used as an auxiliary output face, making surface-to-surface contact with the main input face (FI), by covering it over a first height (h1) from an edge of the main input face corresponding to an edge (E1) of the plate between said face and a base (B1), said covered surface forming the first injection window (I1) and the uncovered surface forming the second injection window (I2);
a second lateral face (f2), which is the other of the two lateral faces at right angles, is used as an auxiliary face for light input into the guide for a first light source from the nighttime and daytime sources, which is arranged on a specific carrier board in a plane parallel to and facing said auxiliary input face, and emits in a direction orthogonal to the carrier-board plane, in the direction of said auxiliary input face (f2); and
the third lateral face (f3) is the reflective face ($R_{100}$), for reflecting the light emitted by said first source in the direction of the first injection window (I1) on the main input face,
said arrangement allowing indirect injection of light from said first source into the plate, by reflection within the auxiliary prism (PA1).

3. The lighting device according to claim 2, wherein the other light source is arranged on a specific carrier board and emits in a direction orthogonal to the carrier-board plane, in the direction of the second injection window (I2) on the main input face, allowing direct injection of light into the plate.

4. The lighting device according to claim 2, wherein the nighttime and daytime light sources are arranged on a common carrier board (PCB-c) which is arranged in a plane that is parallel to and heightwise with respect to the second injection window (I4), and
the first light source is arranged on the back face of said carrier board and emits in a direction parallel to the carrier-board plane, in the direction of the auxiliary input face (f2) on the auxiliary prism (PA3), allowing indirect injection of light into the plate, by reflection within the auxiliary prism (PA3) and the other light source is arranged on the front face of said carrier board and emits in a direction orthogonal to said carrier-board plane, in the direction of the second injection window (I4), allowing direct injection of light into the plate.

5. The lighting device according to claim 1, wherein the first (I3) and second (I4) injection windows are defined by means of an auxiliary prism (PA3') which is arranged such that:

a first lateral face (f1'), which is one of the two lateral faces at right angles, runs in the longitudinal direction with respect to the plate in the continuation of a base of the plate, a second lateral face (f2'), which is the other of the two lateral faces at right angles, runs in a plane parallel to the main input face, on an outer side of the guide, the third lateral face (f3') is the reflective face, in an inclined plane facing the main input face, which defines, as the first injection window (I3'), the surface delimited on the main input face by projection, and the second injection window (I4') is the remaining surface on the main input face, and wherein the nighttime and daytime light sources are arranged on a common carrier board (PCB-c) which is arranged in a plane that is parallel to and heightwise with respect to the second injection window (I4), and the first light source is arranged on the back face of said carrier board and emits in a direction parallel to the carrier-board plane, in the direction of said reflective, third lateral face (f3') of the auxiliary prism (PA3'), allowing indirect injection of light into the plate, by reflection off the auxiliary prism (PA3') and the other light source is arranged on the front face of said carrier board and emits in a direction orthogonal to said carrier-board plane, in the direction of the second injection window (I4'), allowing direct injection of light into the plate.

6. The lighting device according to claim 1, wherein the first and second light injection windows (I1', I2') on the main input face are defined by an auxiliary prism (PA4), the two lateral faces at right angles of which are reflective, and the edge (e3) between these two faces delimits the first (I1) and second (I2) injection windows on either side on said main input face (FI), the daytime and nighttime sources each being arranged on a respective carrier board, on either side of the auxiliary prism, and each emitting in a direction parallel to the plane of the respective carrier board in the direction of a respective reflective face of the auxiliary prism, allowing indirect injection of light into the plate through a respective injection window, by reflection off the auxiliary prism.

7. The lighting device according to claim 2, comprising a first auxiliary prism (PA1), said first, auxiliary-output, lateral face (f1) of which defines the first injection window (I1), and which is arranged such that said second, auxiliary-input, lateral face (f2) extends a base of the plate in the longitudinal direction, and a second auxiliary prism (PA2), said first, auxiliary-output, lateral face (f1) of which defines the second injection window (I2), and which is arranged such that said second, auxiliary-input, lateral face (f2) extends a base of the plate in the longitudinal direction, and the arrangement of the daytime and nighttime light sources of which is such that each one is arranged on a specific carrier board and emits in a direction orthogonal to the carrier-board plane in the direction of the respective auxiliary input face, such that, for each of the light sources, there is indirect injection of the light emitted by each light source into the plate, by reflection within the respective auxiliary prism.

8. The lighting device according to claim 1, wherein the first and second injection windows divide the main input-face height of the plate substantially equally.

9. The lighting device according to claim 1, wherein the height of the injection window associated with the daytime light source is greater than the height of the injection window associated with the nighttime light source.

10. The lighting device according to claim 1, wherein the one or more auxiliary-prism shape and main-shape of the plate (PP) are made of identical or compatible materials and assembled together by bonding.

11. The lighting device according to claim 5, wherein the one or more auxiliary-prism shape and main-shape of the plate (PP) are made of identical or compatible materials and assembled together by bonding wherein the main-shape of the plate and/or the auxiliary-prism shape are configured to promote the mechanical strength of the assembly.

12. The lighting device according to claim 1, wherein the plate (PP) and the one or more auxiliary prisms (PA1, PA2) form a monolithic optical part obtained by moulding or machining an optically transparent material, then depositing a surface coating on the one or more reflective lateral faces of the one or more auxiliary prisms, or said surface coating is a dielectric thin-film structure, or a metal thin-film structure, or a microprism film.

13. The lighting device according to claim 1, wherein the auxiliary-prism lateral face, which is arranged to receive the light from the nighttime source, includes an optical filter in the form of a surface-deposited dielectric thin-film structure $(R_{100})$.

14. The lighting device according to claim 1, wherein for at least one auxiliary prism, an angle between a reflective lateral face and another lateral face, which may or may not be reflective, of the auxiliary prism is adjusted so as to optimize the distribution of light reflected by the auxiliary prism over a corresponding injection window on the main input face.

15. The lighting device according to claim 1, wherein the plate is a plate with a light extraction gradient along the longitudinal direction of the plate, corresponding to the direction of lateral injection via the main input face (FI).

* * * * *